(12) United States Patent
Miller et al.

(10) Patent No.: US 9,845,253 B2
(45) Date of Patent: Dec. 19, 2017

(54) METHOD AND APPARATUS FOR TREATING NATURAL GAS AND OIL WELL DRILLING WASTE WATER

(75) Inventors: Francis C. Miller, Livonia, NY (US); Steve Addleman, Somerset, PA (US)

(73) Assignees: Lake Country Fracwater Specialists, LLC, Livonia, NY (US); Addleman Enterprises, Inc., Somerset, PA (US)

( * ) Notice: Subject to any disclaimer, the term of this patent is extended or adjusted under 35 U.S.C. 154(b) by 192 days.

(21) Appl. No.: 14/114,513

(22) PCT Filed: May 2, 2012

(86) PCT No.: PCT/US2012/036050
§ 371 (c)(1),
(2), (4) Date: Jan. 29, 2014

(87) PCT Pub. No.: WO2012/151233
PCT Pub. Date: Nov. 8, 2012

(65) Prior Publication Data
US 2014/0144844 A1    May 29, 2014

Related U.S. Application Data

(60) Provisional application No. 61/481,370, filed on May 2, 2011.

(51) Int. Cl.
*B01D 21/00* (2006.01)
*B01D 21/01* (2006.01)
(Continued)

(52) U.S. Cl.
CPC ............ *C02F 1/52* (2013.01); *C02F 1/78* (2013.01); *C02F 9/00* (2013.01); *C02F 1/001* (2013.01);
(Continued)

(58) Field of Classification Search
CPC .... C02F 1/52; C02F 1/78; C02F 1/001; C02F 5/02; C02F 9/00; C02F 2103/365;
(Continued)

(56) References Cited

U.S. PATENT DOCUMENTS 2,985,307 A * 5/1961 Grasmere et al. ........ 210/167.11
3,337,449 A * 8/1967 Kappe ..................... C02F 3/006
210/138

(Continued)

FOREIGN PATENT DOCUMENTS

| CN | 102030435 A1 | 9/2009 |
| EP | 930273 A2 * | 7/1999 |
| WO | 2011026197 A1 | 3/2011 |

OTHER PUBLICATIONS

English translation of Eppler et al. EP 0930273 A2, Published Date Jul. 21, 1999; "Method and device for the treatment of surface water with a high algae content".*

*Primary Examiner* — Claire Norris
(74) *Attorney, Agent, or Firm* — John M. Hammond; Patent Innovations LLC (57) ABSTRACT

A method of treating contaminated water effluent from a well drilling operation. The method comprises decomposing organic contaminants in the effluent by bubbling a gas containing ozone through the effluent; adding a coagulant to increase the particle size of solid particles contained in the effluent; adding a flocculant to increase the particle size of solid particles contained in the effluent, thereby forming flocs suspended in the effluent; and filtering the flocs from the effluent to produce a filtrate and flocculated solids. The method may further comprise adding the coagulant into a stream of effluent flowing within a first conduit under controlled shear conditions, and adding the flocculant into a stream of effluent containing pin flocs flowing within a second conduit under controlled shear conditions. The (Continued)

method may further comprise delivering the effluent containing the suspended flocs into a filter through a conduit floating in the effluent contained in the filter.

15 Claims, 4 Drawing Sheets

(51) Int. Cl.
| | |
|---|---|
| *C02F 1/52* | (2006.01) |
| *C02F 1/72* | (2006.01) |
| *C02F 1/78* | (2006.01) |
| *C02F 9/00* | (2006.01) |
| *C02F 1/00* | (2006.01) |
| *C02F 5/02* | (2006.01) |
| *C02F 101/30* | (2006.01) |
| *C02F 103/36* | (2006.01) |

(52) U.S. Cl.
CPC ............ *C02F 5/02* (2013.01); *C02F 2101/30* (2013.01); *C02F 2103/365* (2013.01); *C02F 2201/008* (2013.01)

(58) Field of Classification Search
CPC .. C02F 2201/008; C02F 2101/30; C02F 7/78; C02F 1/72; E21B 43/34; B01D 21/01
USPC ............. 210/119, 121, 125, 126, 128, 167.2, 210/170.05, 242.1, 608, 702, 721, 723, 210/726, 738, 747.6, 749, 727, 724, 758, 210/760; 166/266, 267, 305.1, 308.1, 166/308.2; 175/66, 206, 207
See application file for complete search history.

(56) References Cited

U.S. PATENT DOCUMENTS

| | | | |
|---|---|---|---|
| 5,451,328 A * | 9/1995 | Bottero et al. ................ 210/724 |
| 5,643,443 A | 7/1997 | Ishikura |
| 7,344,647 B2 * | 3/2008 | Stewart ........................ 210/703 |
| 7,931,816 B2 | 4/2011 | Conger et al. |
| 7,967,988 B1 * | 6/2011 | Miller .......................... 210/727 |
| 8,678,354 B2 * | 3/2014 | Kerfoot ............... B01D 17/0205 261/102 |
| 2001/0007314 A1 | 7/2001 | Sherman |
| 2006/0006114 A1 * | 1/2006 | Deskins ............. B01D 21/0012 210/724 |
| 2006/0249464 A1 * | 11/2006 | Conger et al. ................ 210/760 |
| 2007/0034571 A1 | 2/2007 | Costa et al. |
| 2007/0102359 A1 * | 5/2007 | Lombardi ............ B01D 17/085 210/639 |
| 2008/0237141 A1 * | 10/2008 | Kerfoot ........................ 210/739 |
| 2010/0125044 A1 | 5/2010 | Keister |
| 2010/0314327 A1 * | 12/2010 | Lean ..................... B01D 21/01 210/738 |
| 2011/0042320 A1 | 2/2011 | Allen |
| 2011/0186525 A1 * | 8/2011 | Dixit ........................ C02F 1/78 210/708 |

* cited by examiner

METHOD AND APPARATUS FOR TREATING NATURAL GAS AND OIL WELL DRILLING WASTE WATER

CROSS-REFERENCE TO RELATED PATENT APPLICATIONS

This application claims priority from U.S. Provisional Patent Application No. 61/481,370 filed May 2, 2011, the disclosure of which is incorporated herein by reference. This invention is also related to the inventions disclosed in U.S. patent application Ser. No. 12/914,072 filed Oct. 28, 2010, and U.S. Provisional Application for Patent No. 60/255,504, filed Oct. 28, 2009, the disclosures of which are incorporated herein by reference.

TECHNICAL FIELD

This invention relates to the removal of contaminants from waste water discharged at a gas wellhead, and more particularly to the removal of contaminants from drilling water that is used during the process of drilling a well bore, and that is subsequently discharged from the wellhead. The waste water may contain petroleum-based drilling muds. The waste water may be treated as it is discharged from a well bore, or after it is temporarily stored in a nearby lagoon or tanks.

BACKGROUND ART

Certain subterranean geologic formations contain significant reservoirs of natural gas. For example, the Marcellus Shale subterranean formation, which extends from central and western New York southwardly through Pennsylvania, West Virginia, and eastern Ohio, contains significant natural gas deposits. Extraction of this gas has been made economically and technically feasible by the utilization of a technology referred to as hydraulic fracturing, commonly abbreviated as "hydrofracking," or "fracking." This technology utilizes injection of large volumes of water at high pressure to fracture the subterranean shale structures, which causes them to separate and release the pockets of methane gas contained within the shale strata.

During the drilling of the wells, drilling mud and treated water are utilized for lubrication, suspension of drilling wastes, and as weighting agents to form a plug to restrain the pressure of the natural gas within the well bore. This drilling operation produces a waste effluent stream referred to as "pit water." This pit water is the liquid and semi-solid remnants resulting from the drilling process typically remaining after the bulk of the rock cuttings have been removed by conventional means. This pit water contains contaminants in the form of drilling mud, pulverized rock cuttings and chemicals from the subterranean structures, as well as from pretreatment of the water with certain chemicals prior to performing the drilling along with other debris. As much as one hundred thousand gallons of pit water may be generated from the drilling process for each well. Separation of the rock cuttings and drilling muds from this water is needed.

The contaminants in this water render it unsuitable for reuse except in small proportions. Disposal of the water and the organically contaminated solids contained therein has become an expensive proposition for the well developers and also a difficult environmental problem. Treatment of the water with solidification additives is sometimes used. New environmental regulations, as well those proposed and likely to be implemented, may severely limit the ability to dispose of or treat this water by conventional means within the states of Pennsylvania and New York as well as Texas, and Idaho among others, and some foreign countries. There is a significant need by the well developers for technologies which will treat the water to enable its reuse to a maximum extent, and for the cost effective and environmentally satisfactory disposal of the contaminants contained in it.

The contaminants in this water include many of the following components:
Sodium chloride.
Calcium and magnesium (hardness) salts, typically in the bicarbonate and/or chloride form.
Soluble sulfate salts.
Volatile organic compounds (VOC) resulting from the degradation of the ancient sea creatures captured within the shale formation. (The VOCs may include small amounts of crude oil.)
Residual organic compounds (ROC) from the water treatment chemicals introduced into the drilling water to enhance the drilling process.
Pulverized rock cuttings.
Bentonite clay which may be a component of the drilling mud.

The following are also possibly present, but to a lesser degree:
Barium salts, typically in either the soluble chloride form or the insoluble sulfate form, which may be a component of the drilling mud or contained with the rock cuttings.
Strontium salts, typically in either the soluble chloride form, or the insoluble sulfate form which may be component of the drilling mud or contained with the rock cuttings.

Common practice may provide for some reuse of the pit water in limited quantities as makeup water for hydrofracturing water or other drilling operations, provided that the pit water is from a "water based" drilling mud operation and it is clarified through sedimentation, and the soluble contaminants levels are below predetermined limits. Alternatively, previous disposal of the pit water has been accomplished by transport to and subsequent treatment at conventional municipal waste water treatment facilities and specialized industrial treatment facilities, provided that the drilling muds utilized are "water based." New and pending regulations may severely limit this option. "Oil based" drilling mud may not be treated in significant quantities in conventional municipal waste water treatment facilities. In fact, there are considerable limitations to the disposal of "oil based" pit waters altogether. Most of these pit waters are treated with thermal technologies, bio-remediation, deep well injection, addition of solidifiers (such as polymers, sawdust, wood chips, lime, or vermiculite) and/or evaporation of the water fraction followed by landfill disposal of the remaining contaminated solids.

The sodium chloride is not considered a significant problem relative to the reuse of the water up to some practical limit that is determined by the drilling operator.

The soluble barium and strontium salts, and alternatively the soluble sulfate salts, form insoluble solids during and after the fracking process, which have been determined to be degradative to the drilling and/or hydrofracturing process when these materials exceed certain levels which depend upon the particular operator of the drilling rig. Elevated levels of these salts limit options for disposal as well. The soluble calcium salts form hardness scale in the subterranean shale structures and are similarly limited in concentration but at higher levels. Both of these conditions may result in the obstruction of portions of the fissures within the shale strata created by the fracking process when the water is reused, if the concentrations of these salts contained in it are excessive. The presence of the residual or incipient volatile organic chemicals in the return water results in further difficulties in proper reformulation of it as fracking water for reuse. The pulverized rock cuttings and residual mud present in this pit water represent suspended solids which are unacceptable in hydrofracking or drilling fluids.

The removal of certain suspended solids in the waste water from water based drilling mud is defined in various documentation and literature. The solidification of the salts may be accomplished by conventional evaporation technology, gelatinizing of the solution, or precipitation means. The current method of return water remediation is to transfer it upon its discharge from the wellhead into tanker trucks or pits, decant any clarified supernatant following settling or treatment for reuse, and then transfer the unusable remaining water and/or sludge into tankers. The tankers of sludge are then hauled substantial distances to off-site municipal or industrial water treatment plants, or to other solidification pits where further solidifiers may be added. This is expensive, and additionally, it may soon be prohibited in many jurisdictions (particularly New York, Pennsylvania and Texas) by new environmental regulations.

The aforementioned U.S. patent application Ser. Nos. 12/914,072 and 60/255,504 of Miller provide for a modular, portable and cost effective method and apparatus for treating the frack water for the removal of the barium, calcium and strontium salts onsite at the wellhead. However, there remains a need for a modular, portable, and cost effective method and apparatus for treating waste water produced from the utilization of oil-based drilling mud. The separation of the settleable and finely dispersed suspended solids from the aqueous phase must be accomplished in a manner such that the solids may be disposed of separately, and the water may be reused. It is desirable that the process and apparatus also accommodate the presence of any residual or volatile organic chemicals, typically including finely dispersed or emulsified diesel oil or other "oil" components of the drilling mud formulation, or natural crude oil component brought up from the wellhead; and residual soluble precipitate-forming salts as well.

DISCLOSURE OF THE INVENTION

The Applicants have developed a method and apparatus to meet this need. The method and apparatus separate and remove the settleable and finely dispersed suspended solids from the waste water from oil based drilling mud operations. The method and apparatus also removes residual soluble precipitate forming salts where applicable. The suspended solids are coagulated and flocculated and then dewatered, which renders the resulting solids mass suitable for conventional landfill or on site disposal. Any problematic levels of barium, strontium, calcium and magnesium salts may be selectively precipitated into their inert forms for removal and disposal as recited in the aforementioned patent application Ser. Nos. 12/914,072 and 60/255,504 of Miller. The soluble sulfate salts are precipitated in the inert barite and celestite forms which are similarly coagulated and flocculated, and then dewatered for disposal.

The product water from the instant process is a sodium chloride (brine) solution, which is suitable for reuse as a portion of the makeup water in drilling operations or hydrofracturing operations. The instant process may include an ozone treatment process for removal of organic contamination prior to treatment to improve chemical efficiency and performance. In addition, ozone treatment, or alternately carbon absorptions, may be utilized following filtration to remove any residual organic materials.

More specifically, in accordance with the invention, there is provided a method of treating contaminated water effluent from a well drilling operation. The method comprises decomposing organic contaminants in the effluent by bubbling a gas containing ozone through the effluent; adding a coagulant to increase the particle size of solid particles contained in the effluent; adding a flocculant to increase the particle size of solid particles contained in the effluent, thereby forming flocs suspended in the effluent; and filtering the flocs from the effluent to produce a filtrate and flocculated solids.

The ozone concentration in the gas is preferably at least one percent by weight. The size of the gas bubbles is preferably less than 500 microns in diameter. The pH of the effluent during ozonation (gas bubbling) is preferably between 3 and 10. For most pit water effluent mixtures, the ozone treatment will operate in the range of 10 ppm ozone to 50 ppm ozone concentration with a pit water effluent average residence time in the apparatus 18 of between approximately 10 and 30 minutes. The method may further comprise causing pin flocs to form in the effluent by adding the coagulant. The method may further comprise adding the coagulant into a stream of effluent flowing within a first conduit under controlled shear conditions, and adding the flocculant into a stream of effluent containing pin flocs flowing within a second conduit under controlled shear conditions. The method may further comprise delivering the effluent containing the suspended flocs into a filter through a conduit floating in a portion of the effluent contained in the filter.

BRIEF DESCRIPTION OF THE DRAWINGS

The present disclosure will be provided with reference to the following drawings, in which like numerals refer to like elements, and in which.

BEST MODE FOR CARRYING OUT THE INVENTION

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

For a general understanding of the present invention, reference is made to the drawings. In the drawings, like reference numerals have been used throughout to designate identical elements. It is to be understood that the labeling of the vessels, conduits, pumps, filters, and other process equipment with dimensions, volumes, flow rates, capacities, materials of construction, and other specifications is meant to be exemplary only, and not limiting with respect to the instant apparatus and method. The apparatus and method may be operated in many other suitable configurations within the scope of the present disclosure.

Figure 1:
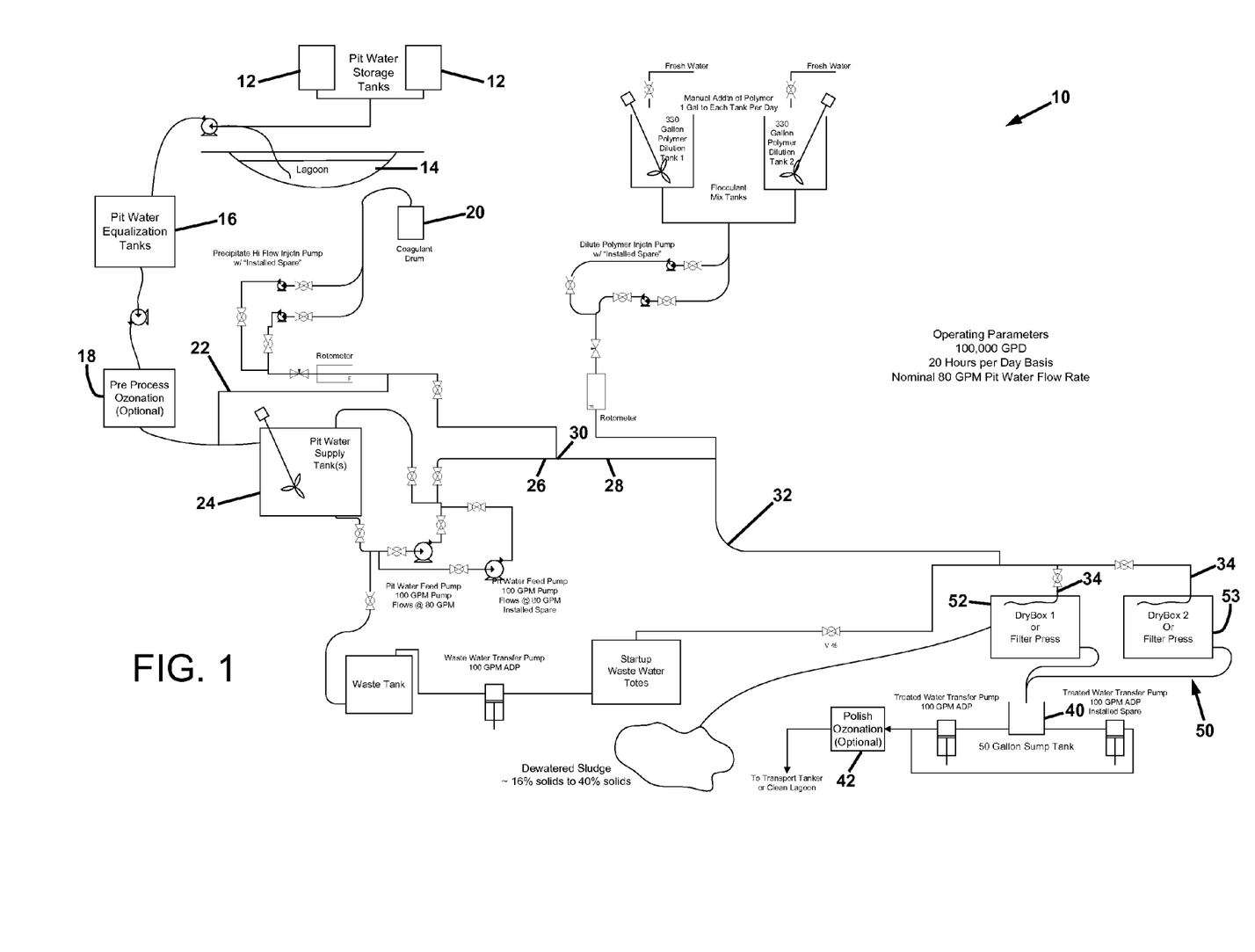
FIG. 1 is a schematic diagram of one exemplary embodiment of the instant process and apparatus for treating waste water from oil based drilling mud.
Figure 2:
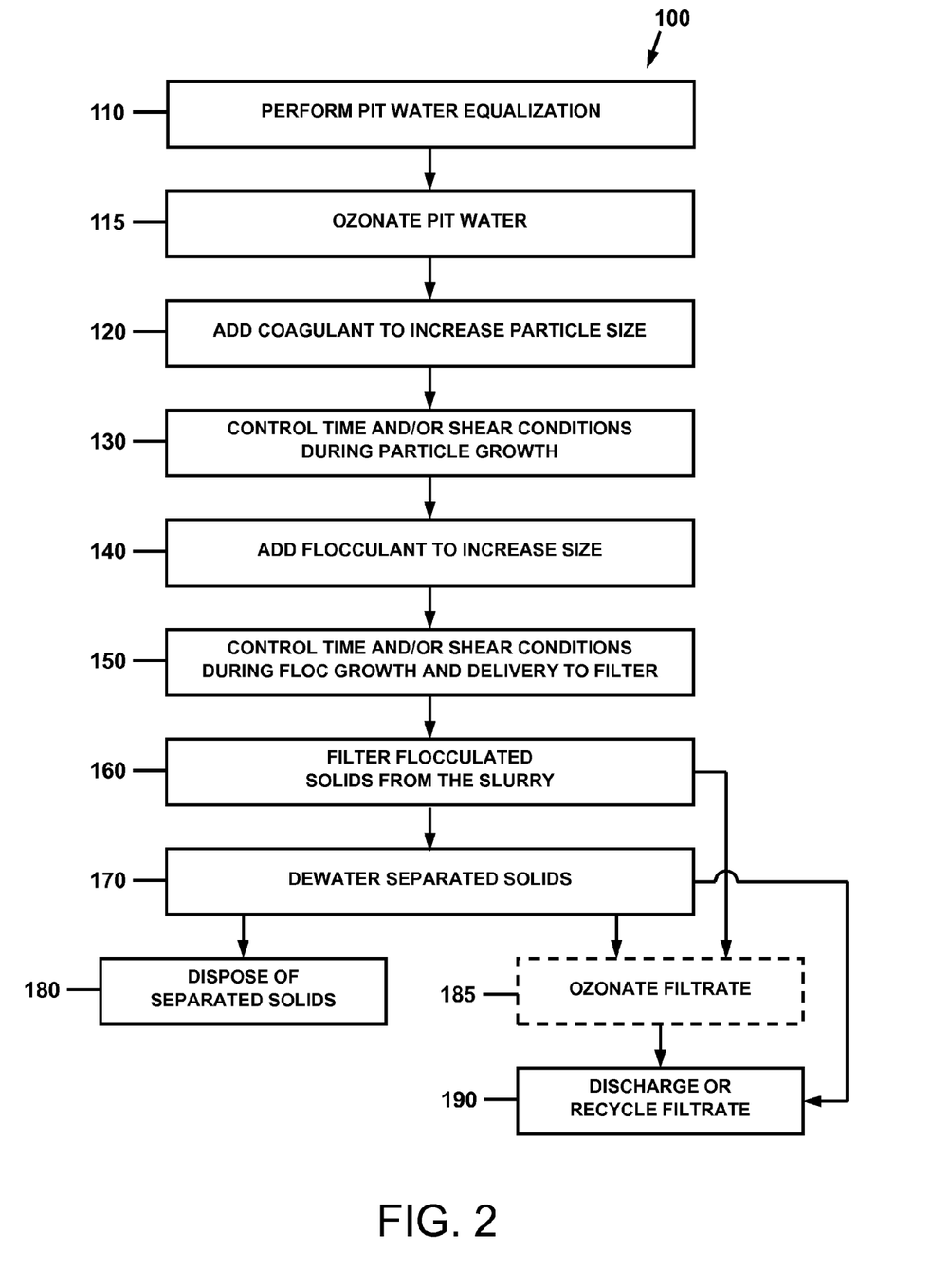
FIG. 2 is a flowchart of the instant process for treating pit water.

Referring to FIG. 1 (which includes certain parameters that are recited above, and that are exemplary only and not limiting) and FIG. 2, an apparatus 10 and a process 100 for treatment of gas and oil well drilling waste water are shown. The process 100 is comprised of the sequential addition and timed reaction of chemicals for the coagulation of the contaminants and their subsequent flocculation and filtration.

The waste water that is discharged from the wellhead (not shown) may be captured and directed into a tanker truck (not shown), which may transport the waste water to a storage tank(s) 12 or alternately a lagoon 14, and transfer the drilling waste water thereto. Alternatively, the drilling waste water may be captured and pumped directly into the storage tank 12 if the drilling waste water treatment apparatus 10 is located near the wellhead. The apparatus 10 may also include or be installed proximate to the outlet of an ozonation treatment system. The storage tank 12 or lagoon 14 may be between the ozonation system and the apparatus 10.

Some or all of the apparatus 10 may be mounted on a flatbed trailer or in an enclosed trailer so as to make it transportable as a tractor trailer rig or smaller tongue style trailer, in a manner similar to that disclosed in the aforementioned patent application Ser. No. 12/914,072, and shown in FIGS. 9A and 9B therein. In one embodiment, most of the apparatus 10 is mounted on or in a trailer, with one or more "roll-off" box-type filters 52 and 54 being separately transportable.

The apparatus 10 is comprised of various tanks, pumps, filtration device(s) and other equipment for performing coagulation, flocculation and filtration operations on the drilling waste water. In step 110, a portion of drilling waste water is delivered into a tank or tanks 16 for "equalization," i.e., accumulation and mixing of the influent stream to dampen out variations in the chemical and/or physical character of the waste water.

In step 115, the equalized waste water may optionally be treated with ozone, in a suitable source or apparatus 18. Ozonation 115 is used to decompose any organic contaminants contained in the waste water to carbon dioxide and water. In gas well drilling, these organic components originate primarily from "oil based" constituents that are added to the drilling fluids.

The ozonation treatment requirements are dependent upon the constituents of the waste water such as metals, bacteria, $H_2S$, hydrocarbons, etc., as well as total organic carbon (TOO) and biochemical oxygen demand (BOD) of the constituents, and temperature and pH. With the exception of the pH, all of the variation in constituents may be accommodated by adjustments to the ozonation process 115. The Applicants have found that for the ozonation process 115 to work most effectively, the pH level is generally required to be between 3 and 10 but the system will still function outside this range. For most pit water mixtures, the ozone treatment 115 will operate in the range of 10 ppm ozone to 50 ppm ozone concentration with a pit water average residence time in the ozone apparatus 18 of between approximately 10 and 30 minutes. Pit water having elevated level of hydrocarbons and BOD may require the oxidation/contact chamber in the apparatus 18 to be pressurized and the dwell time extended. The required pressure may be approximately in the range of 1 to 5 atmospheres and the dwell time extended to between approximately 30 and 60 minutes.

The Applicants have discovered that the size of ozone bubbles needed to accomplish complete oxidation of contaminants is important. Diffusion of ozone gas into water from a sintered pipe or similar device will normally be insufficient for treatment of the pit water. The use of microbubbles with a diameter of approximately 5 to 500 microns is normally sufficient. The microbubbles may be formed by using a venturi contact system such as is commercially available and well known in the art. However, pit waters with elevated levels of contamination above 50 milligrams/liter (mg/I) hydrocarbons, 250 mg/I TOO, and/or 500 mg/l BOD will require the infusion of nanobubbles with a diameter of approximately 0.1 up to 4 microns delivered under pressure with lengthened residence time of approximately 30 to 60 minutes. The concentration of ozone in the ozone/oxygen gas is preferably at the highest percent by weight available, in the range of approximately 6 percent to 10 percent, in order to optimize the efficiency of the operation.

In step 120, a coagulant is introduced from a source 20 into the drilling waste water, which is a slurry containing suspended solids such as rock dust and drilling mud. This coagulant forms a fine "pin floc" of the suspended and settling materials which will later be formed into a larger floc suitable for efficient filtration. The optimum coagulant for this application has been determined to be a metal chloride, such as aluminum chlorohydrate. Multiple alternate metal chlorides may also be utilized. However, following extensive testing including ferric chloride as the coagulant, the Applicants have observed that the aluminum chlorohydrate is visibly, significantly more effective in terms of formation of the pin floc under varying conditions and concentrations of the solids in the pit water. The addition ratio of the coagulant has been determined to be approximately 0.001 to 0.01 parts of the coagulant per part of the solution, although higher concentrations may be used if the waste water has higher percent solids or has been pre-treated to concentrate it. The coagulant may be introduced to the suspended solids slurry as a neat (concentrated liquid) material or as a diluted aqueous solution provided from a vessel 20, depending upon the site specific requirements and available feed equipment. It may be delivered through conduit 22 and blended and reacted with the slurry in either a batch or continuous tank 24.

Alternatively, the waste water slurry may be provided as a continuous feed into a moving flow of the slurry in a conduit 26. The Applicants have discovered that optimum coagulation occurs in step 130 when the section 28 of the conduit 26 that is downstream from the coagulant injection point 30 is a corrugated 1½" diameter hose which has a length of approximately 20 to 50 linear feet and the velocity is approximately 4 to 12 feet per second.

Following the formation of pin flocs by the introduction of coagulant, an anionic flocculant is added to the slurry in step 140. This flocculant forms the pin flocs into large flocs which are suitable for efficient filtration. In one embodiment, the optimum coagulant for this application has been determined to be anionic polyacrylimide F-303AH as provided by Water Specialists Technologies, LLC of Sanford, Florida. However multiple alternate anionic poly acrylimides may also be utilized. The addition ratio of the flocculant has been determined to be approximately 0.0001 to 0.0005 parts of the flocculant per part of the solution.

The flocculant may be introduced to the flowing pin floc slurry in conduit 28 as a diluted aqueous solution in the range of 0.1% to 0.5% concentration depending upon the site specific requirements and available feed equipment. It may be blended and reacted with the pin floc slurry into a downstream continuous flocculation tank (not shown), or as a continuous feed into a moving flow of the pin floc slurry in a pipe or other conduit 32. The Applicants have discovered that optimum flocculation occurs in step 150 when the conduit 32 is a corrugated 1½" diameter hose which has a length of approximately 20 to 50 linear feet and the velocity is approximately 4 to 12 feet per second.

In step 160, the now flocculated slurry is introduced into a filtration system 50. The filtration system may be comprised of one or more active filter(s) 52 and 53, wherein solids are captured on a filter medium, and then dewatered by the action of inflatable bladders disposed against the medium. One suitable active filter is the "DryBox" filtration system sold commercially by Innovative environmental Products, Inc. of Livonia, N.Y. under License from Idee e Prodotti S.r.l. of Cavenago Brianza, Italy. This filter is provided in a multiple solid holding capacities ranging from 5 cubic feet up to 40 cubic yards.

Alternately, other filtration devices such as a plate and frame filter press, rotary drum filter, or other such commercial device may be utilized with the process 100.

Figure 3A:
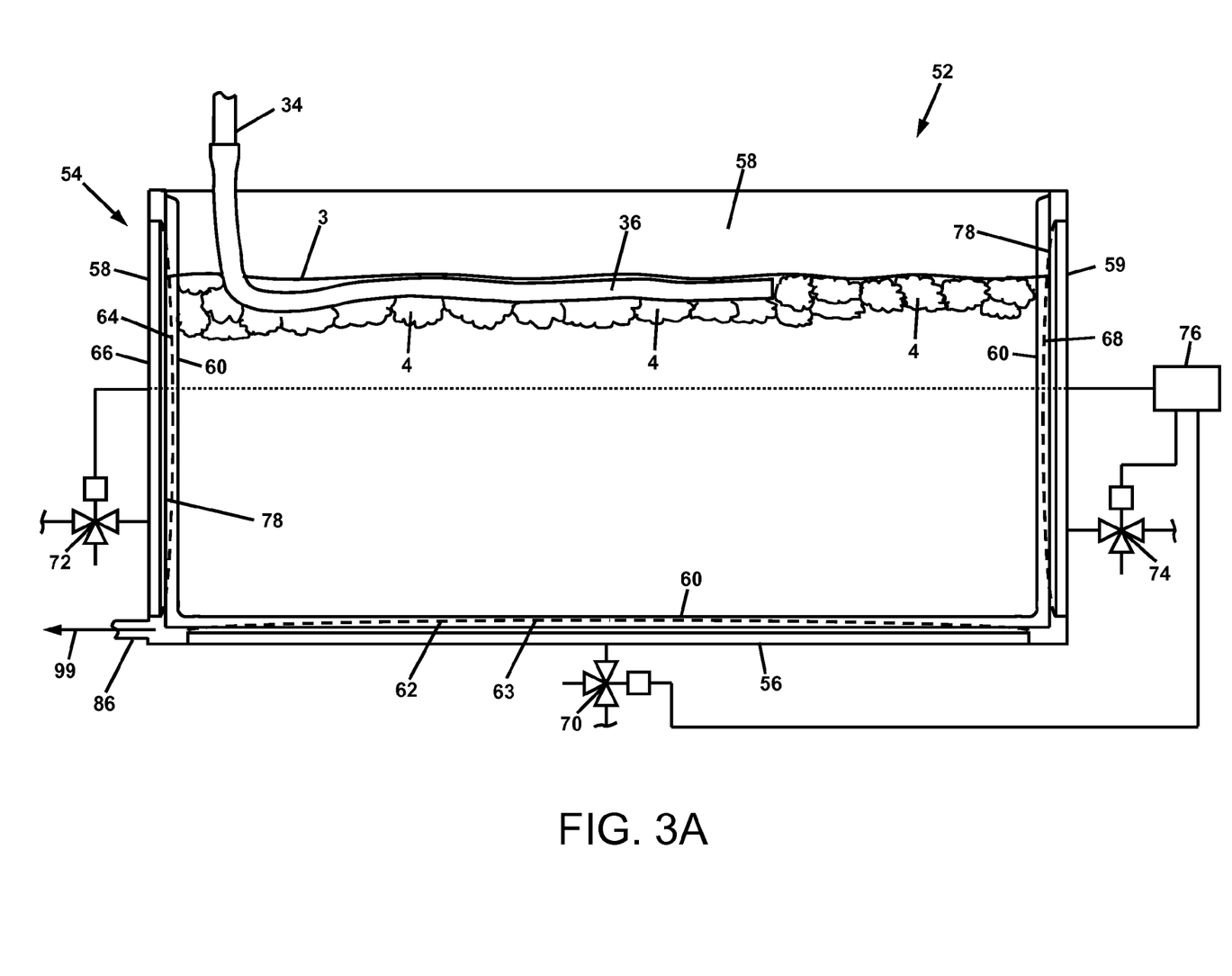
FIG. 3A is a schematic cross-sectional illustration of a "box" type filter that may be used as a part of the instant apparatus, shown during delivery of liquid containing flocculated solids.
Figure 3B:
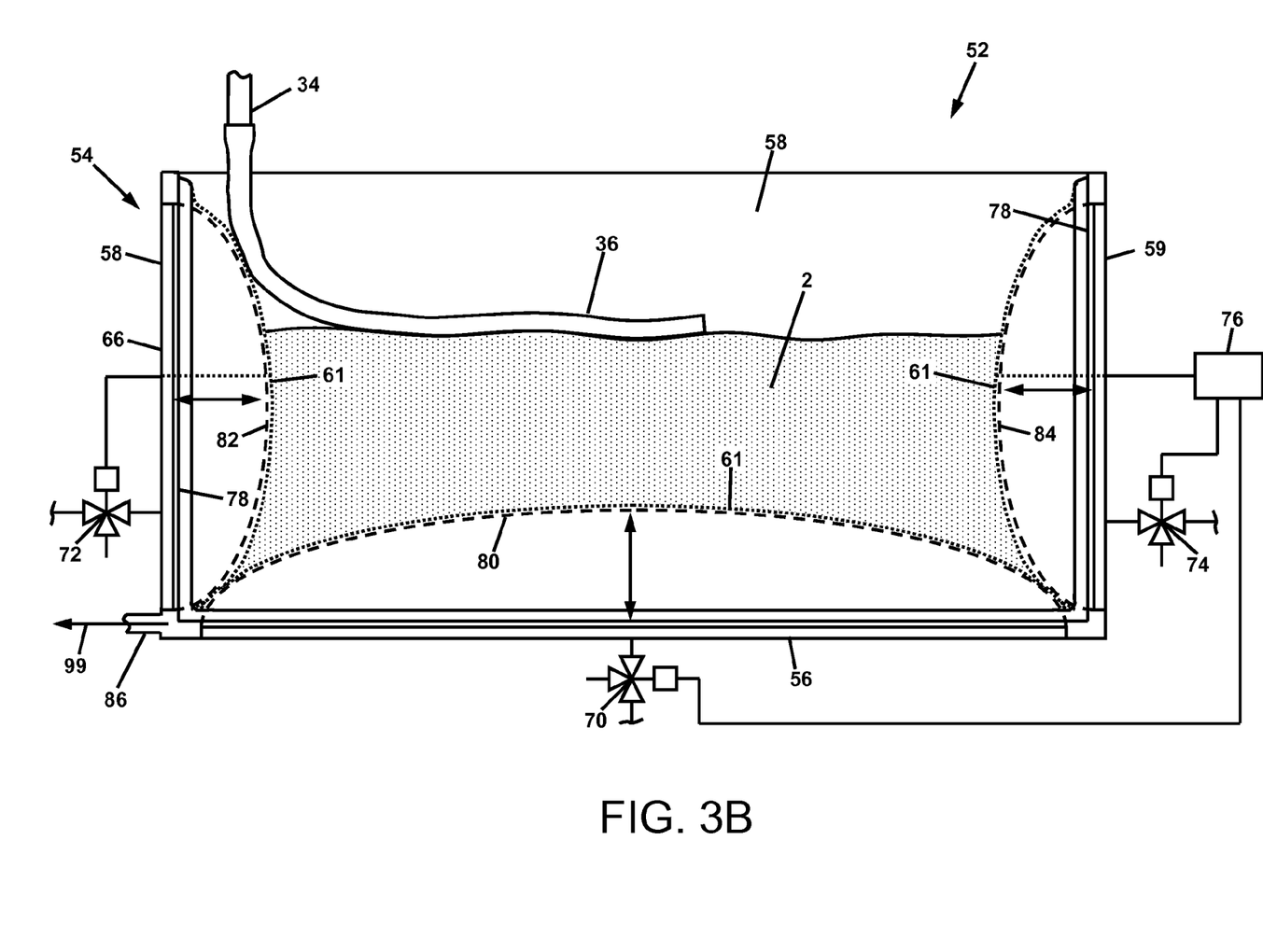
FIG. 3B is a schematic cross-sectional illustration of the filter of FIG. 3A, shown during dewatering of sludge contained therein.

The box filters 52 and 53 may be provided as transportable "roll off" boxes that are similar to refuse collection boxes. Referring to FIGS. 3A and 3B, the box filter 52 (as well as box filter 53) may be comprised of a box-shaped housing 54 having a bottom wall 56, a surrounding side wall 58 that includes a discharge door 59, and a displaceable filter bag 60 disposed within housing 54. The discharge door 59 may be hinged vertically or horizontally. The discharge door 59 facilitates the emptying of the dewatered sludge from the filter. Filter 52 is further comprised of at least one inflatable bladder 62 (shown in dotted line), comprised of a central portion 63 disposed along the bottom wall 56. The bladder 62 may include an end portion 64 disposed along the end wall 66 opposite the discharge door 59. The bladder 62 may also include end portion 68 or portions disposed along the inside face of the discharge door 59. Bladder section 68 may be an independent bladder section interconnected to the bladder 62 or bladders by pneumatic or hydraulic tubing (not shown). The end portions 64 and 68 of bladder 62 may extend up the end wall 66 and discharge door 59 of the housing 54 less than shown in FIGS. 3A and 3B. The end portions 64 and 68 of the bladder 62 may be comprised of single or multiple sections disposed on the end wall or discharge door of the housing 54 interconnected by pneumatic or hydraulic tubing (not shown).

Alternatively, the filter 52 may be comprised of a bottom bladder and one or more independent end wall bladders in place of end portion 64, and one or more independent discharge door bladders and two additional side inflatable bladders (not shown) disposed along the side portions (not shown) of side wall 58. If individual end wall or side wall bladders are used, they may be made independently inflatable and deflatable through respective valves 70, 72, and 74, which are controlled by programmable logic controller 76 or another appropriate control device. Alternatively, all bladders may be connected to a single air source and all inflated simultaneously through a single valve 70 as shown in FIGS. 3A and 3B; or bottom bladder 63 may be connected to a first air source controlled by valve 70, and the end and/or side wall inflatable bladders may be connected to a second air source such that bottom bladder 63 is separately controllable from the end and/or sidewall bladders.

In the embodiment depicted in FIGS. 3A and 3B, the bladder 62 is inflated and deflated by air supplied and exhausted through valve 70. The corner portions of bladder 62 may be held proximate to the juncture of the end wall 66 opposite the discharge door 59 and the bottom wall 56 and proximate to the juncture of the discharge door 59 and the bottom wall 56 by the lower portion of a support basket or frame 78, which also supports the bottom and the vertical sections of filter bag 60 that are disposed along the bottom wall 56 and the side and end walls 58 of the housing 54. Referring in particular to FIG. 3B, the profiles of the inflated bladder 62, and alternate bladder 68 (if provided separately from bladder 62) are indicated by dotted curves 80, 82, and 84. When the bladder 62 (and alternate bladder 68 if provided separately) is pressurized, the bottom portion 62 bulges upwardly while the end portions 64 and 68 bulge inwardly, resulting in the upwardly and inwardly displaced filter bag 61 and the dewatering of the solids 2 therein. As the sludge 2 in the filter 52 is dewatered, at least one outlet 86 permits the drainage of filtrate from housing 54. If separately operable bladders are provided in the filter 52, the respective bladders may be operated sequentially to manipulate the sludge 2 that accumulates on the filter bag 60. Further details on the construction of the active filter may be as disclosed in U.S. Pat. No. 7,972,517 of Miller, the disclosure of which is incorporated herein by reference.

Referring again to FIG. 3A, to perform the filtration step 160 (FIG. 2) with the active filter 52, floc-containing waste water is delivered through inlet conduit 34 into the filter 52 from the floc formation conduit 30. The Applicants have discovered that for the most effective filtration, it is beneficial to introduce the floc-containing waste water through a floating conduit 36. The floating conduit 36 may be made of a buoyant material such as a foam, or it may be comprised of separate buoyant members (not shown). In operation, when floc-containing waste water is delivered into the filter 52, the conduit 36 floats upon the waste water 3 and gently discharges the flocs 4 so as to not disrupt them. (It is to be understood that more flocs 4 may be present in the waste water 3 than shown in FIG. 3A, extending to the bottom of the filter 52.) The Applicants have discovered through experimentation that in many instances the free cascading of the flocculated solids from a pipe down into the dewatering box has a tendency to disrupt the stability of the floc and reduce the filtration performance of the dewatering operation. Thus the use of a floating conduit 36 to introduce the floc into the filter housing 54 is beneficial.

A first portion of filtrate flows through the filter bag 60 by the action of gravity and out of outlet 86 as indicated by arrow 99. A cake of sludge 2 is retained by the filter bag 60. Subsequently, step 170 is performed in which the sludge 2 is dewatered. The bladders 62, 64, and 68 are actuated to manipulate the sludge cake 2, resulting in the discharge of a second portion of filtrate. The bladders 62, 64, and 68 may be repeatedly inflated and deflated in programmed sequences, thereby manipulating the sludge 2 on the filter bag 60 in a manner that maximizes the dewatering thereof.

As alternatives to the box filter 52 and other active filters, various other static style gravity filtration systems available to the industry may be used as the filtration system 50. These include common filtration boxes as provided by Rain for Rent (25 Yard Filter Box) or Flotrend (models RB-25-O-GN-VPF, RB-20-O-GN, RB-20-C-B and/or RB-25-O-GN-S) and other similar agents and various applications of the Geotube® as provided by Marifi Company. These systems perform substantially the same function as the box filter 52. However, the "active filtration" process of the filter 52 is believed to provide enhanced and accelerated dewatering of the filtered solids and is significantly less sensitive to problems associated with upsets in the coagulant and flocculant feed systems. These filters may be configured with a floating conduit in a manner similar to the floating conduit 36 of the filter 52. In addition, the Squeeze Tower Press manufactured and sold commercially by Idee e Prodotti S.r.l. of Cavenago Brianza, Italy, also an active filtration device, may be suitable under conditions requiring finer filtration at lower solids loading rates.

In step 180, the solid sludge is discharged from the box filter 52. If the box filter 52 is of a roll-off construction, the entire box filter 52 may be drawn onto a truck and transported to a suitable dumping site. The product of the process, based upon the ozonation and the chemical coagulation, may be suitable for disposal in a conventional non-hazardous landfill.

The filtrate that is discharged from the box filter 52 in steps 160 and 170 may be discharged into a sump tank 40. In step 185, the filtrate may optionally undergo a "polishing" ozonation process using an ozonation apparatus 42 to decompose any traces of organic constituents contained therein. Alternately the organic compounds may also be removed by carbon absorption, or other suitable means. In step 190, if the filtrate is sufficiently free of dissolved contaminants other than sodium chloride, it may be discharged to the environment, or reused as fracking water. In the event that the clear filtrate contains strontium, barium, magnesium and/or calcium (hardness) salts in addition to sodium chloride salt, it is desirable to remove these salts. In such circumstances, the process 10 may proceed with a subsequent sequential addition and timed reaction of chemicals for the precipitation of these inorganic contaminants and their subsequent coagulation and flocculation and filtration in accordance with the aforementioned patent application Ser. Nos. 12/914,072 and 60/255,504 of Miller. This filtrate has been tested and has generally found to be suitable for use in preparation of the dilute polymer flocculant solution for the process which will reduce requirements for fresh water on the site. The suitability is subject to the brine (sodium chloride) concentration, which is usually less than 40,000 PPM.

It is, therefore, apparent that there has been provided, in accordance with the present invention, a method and apparatus for removal of contaminants from oil and gas well drilling waste water. Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention.

We claim:

1. A method of treating contaminated water effluent from a well drilling operation, the contaminated water effluent containing organic contaminants and solid particles, and the method comprising:
   a) infusing a gas containing ozone through the effluent, and causing complete oxidation and decomposition of the organic contaminants to carbon dioxide and water in the effluent;
   b) adding a coagulant into a stream of effluent flowing within a first conduit to increase the particle size of the solid particles contained in the effluent, wherein adding the coagulant is performed under controlled shear conditions caused by flow of the coagulant and stream of effluent flowing within the first conduit at a velocity of the coagulant and stream of effluent between 4 feet and 12 feet per second, the first conduit having a diameter of 1.5 inches and a length of between 20 and 50 feet;
   c) forming pin flocs in the effluent following the adding the coagulant;
   d) adding a flocculant into a stream of effluent containing the pin flocs flowing within a second conduit to increase the particle size of the solid particles contained in the effluent, thereby forming flocs suspended in the effluent, wherein adding the flocculant is performed under the controlled shear conditions caused by flow of the flocculant and stream of effluent flowing within the second conduit at a velocity of the flocculant and stream of effluent between 4 feet and 12 feet per second, the second conduit having a diameter of 1.5 inches and a length of between 20 and 50 feet; and
   e) filtering the flocs from the effluent to produce a filtrate and flocculated solids.

2. The method of claim 1, wherein the ozone concentration in the gas is at least six percent by weight.

3. The method of claim 1, wherein the infusing a gas containing ozone through the effluent includes infusing gas bubbles into the effluent, and wherein the size of the gas bubbles is less than 0.2 microns in diameter.

4. The method of claim 1, wherein the pH of the effluent during gas infusing is between 3 and 10.

5. The method of claim 1, wherein the filtering the flocs from the effluent further comprises delivering the effluent containing the suspended flocs into a filter through a conduit floating in the effluent contained in the filter.

6. The method of claim 1, further comprising dewatering the flocculated solids.

7. The method of claim 6, wherein the filtering and the dewatering are performed simultaneously.

8. The method of claim 5, wherein the conduit is floating at a top surface of the effluent contained in the filter.

9. The method of claim 5, further comprising maintaining the flocs in an undisrupted state while delivering the effluent containing the suspended flocs into the filter through the conduit floating in the effluent contained in the filter.

10. The method of claim 1, further comprising ozonating the filtrate to decompose organic constituents contained in the filtrate.

11. A method of treating contaminated water effluent from a well drilling operation, the method comprising:
    a) infusing a gas containing ozone through the effluent, and causing complete oxidation and decomposition of the organic contaminants to carbon dioxide and water in the effluent;
    b) adding a coagulant to increase the particle size of solid particles contained in the effluent;
    c) adding a flocculant to increase the particle size of solid particles contained in the effluent, thereby forming flocs suspended in the effluent;
    d) delivering the effluent containing the suspended flocs into a filter through a conduit floating in the effluent contained in the filter; and
    e) separating the effluent to produce a filtrate and flocculated solids.

12. The method of claim 11, wherein the conduit is floating at a top surface of the effluent contained in the filter.

13. The method of claim 11, further comprising maintaining the flocs in an undisrupted state while delivering the effluent containing the suspended flocs into the filter through the conduit floating in the effluent contained in the filter.

14. The method of claim 13, further comprising dewatering the flocculated solids.

15. The method of claim 14, wherein the filtering and the dewatering are performed simultaneously.

* * * * *

UNITED STATES PATENT AND TRADEMARK OFFICE
CERTIFICATE OF CORRECTION

Page 1 of 2

PATENT NO. : 9,845,253 B2
APPLICATION NO. : 14/114513
DATED : December 19, 2017
INVENTOR(S) : Miller et al.

It is certified that error appears in the above-identified patent and that said Letters Patent is hereby corrected as shown below:

In the Drawings

Replace Drawing Sheet 1 of 4 with attached Drawing Sheet 1 of 4

Signed and Sealed this
Third Day of July, 2018

Andrei Iancu
*Director of the United States Patent and Trademark Office*

FIG. 1